US009829045B2

(12) United States Patent
Toma

(10) Patent No.: US 9,829,045 B2
(45) Date of Patent: Nov. 28, 2017

(54) FISHING REEL

(71) Applicant: Globeride, Inc., Tokyo (JP)

(72) Inventor: Hiroshi Toma, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 258 days.

(21) Appl. No.: 14/525,464

(22) Filed: Oct. 28, 2014

(65) Prior Publication Data
US 2015/0115088 A1 Apr. 30, 2015

(30) Foreign Application Priority Data
Oct. 30, 2013 (JP) .................................. 2013-225939

(51) Int. Cl.
*A01K 89/01* (2006.01)
*F16C 33/76* (2006.01)
*A01K 89/015* (2006.01)

(52) U.S. Cl.
CPC ........ *F16C 33/765* (2013.01); *A01K 89/0193* (2015.05); *A01K 89/01928* (2015.05)

(58) Field of Classification Search
CPC ............ A01K 89/01; A01K 89/011221; A01K 89/011223; A01K 89/015; A01K 89/01928; A01K 89/0193; F16C 33/765
See application file for complete search history.

(56) References Cited

U.S. PATENT DOCUMENTS

| | | | | |
|---|---|---|---|---|
| 5,152,539 A | * | 10/1992 | Takii ..................... | F16C 33/765 277/347 |
| 5,238,254 A | * | 8/1993 | Takii ..................... | F16C 33/765 277/347 |
| 2003/0209621 A1 | * | 11/2003 | Maeda ................... | A01K 89/00 242/321 |
| 2010/0090413 A1 | * | 4/2010 | Mahoney .............. | F16C 33/765 277/410 |
| 2012/0048981 A1 | * | 3/2012 | Ohara ................ | A01K 89/0108 242/230 |

FOREIGN PATENT DOCUMENTS

JP 2013-000110 1/2013

OTHER PUBLICATIONS

Chinese Office Action dated Jul. 22, 2016 for Application No. 201410592532.9.
Chinese Office Action dated Dec. 16, 2016 for Application No. 201410592532.9.

* cited by examiner

Primary Examiner — Emmanuel M Marcelo
(74) Attorney, Agent, or Firm — Pillsbury Winthrop Shaw Pittman, LLP

(57) ABSTRACT

One object is to provide a fishing reel including a magnetic fluid sealed bearing wherein foreign substances are shut out from the magnetic fluid seal to prevent degradation of the magnetic fluid (degradation of the magnetic sealing function). In accordance with one aspect, the fishing reel of the present invention includes a magnetic fluid sealed bearing rotatably supporting a drive shaft (pinion). Protection walls are disposed opposite to each other on or near the sides of the bearing body so as to shut out foreign substances from the bearing body of the magnetic fluid sealed bearing.

14 Claims, 9 Drawing Sheets

FISHING REEL

CROSS-REFERENCE TO RELATED APPLICATIONS

This application is based on and claims the benefit of priority from Japanese Patent Application Serial No. 2013-225939 (filed on Oct. 30, 2013), the contents of which are hereby incorporated by reference in their entirety.

TECHNICAL FIELD

The present invention relates to a fishing reel wherein a magnetic fluid seal is provided integrally with a bearing, and in particular to a fishing reel wherein foreign substances are shut out of the magnetic fluid seal.

BACKGROUND

There have been conventionally known fishing reels including a magnetic sealing mechanism using a magnetic fluid applied to a bearing. For example, Japanese Patent Application Publication No. 2013-110 (the "'110 Publication") discloses a magnetic fluid sealed bearing wherein the magnetic fluid seal is retained integrally with the bearing such that foreign substances such as seawater, sand, and dust may not adhere to or penetrate into a bearing body which rotatably supports a drive shaft (e.g., a spool shaft rotatably supporting a spool for winding a fishing line, a pinion to be engaged with and disengaged from the spool shaft, or a handle shaft) rotationally driven in accordance with rotational operation of a handle for winding a fishing line (so as to shut out water and dust for maintaining rotational performance of the bearing).

In general, a lubricant such as grease or oil is applied to a driving section of a drive shaft driven in accordance with operation of the handle for winding a fishing line. Such a lubricant may unfavorably adhere to or penetrate into the magnetic sealing section of the magnetic fluid sealed bearing. The lubricant tends to adhere to or penetrate into a bearing particularly on a pinion which moves in axial directions upon switching operation for switching a clutch mechanism between a clutch-on state wherein a rotational drive force of the handle is transmitted to a spool via a drive gear and the pinion and a clutch-off state wherein the drive force transmission state is canceled and the spool rotates freely. That is, a grease is normally applied to teeth of the pinion meshing with the drive gear; therefore, when the pinion moves in axial directions upon the switching operation of the clutch mechanism, an oil separated from the grease applied to the teeth of the pinion moves in axial directions and penetrates into the magnetic fluid sealed bearing rotatably supporting the pinion so as to degrade the magnetic fluid.

In the magnetic fluid sealed bearing disclosed in the '110 Publication wherein a magnetic fluid seal is disposed adjacent to a side of the bearing body, an O-ring is used to seal the bearing on the side of the magnetic fluid seal not magnetically sealed (the side opposite to the side where the magnetic fluid is retained); therefore, the magnetic sealing section tends to move, and the magnetic fluid seal does not integrate well with the bearing body, resulting in degraded built-in work efficiency and the maintenance efficiency of the bearing. If the magnetic fluid seal is disposed in the bearing, the bearing can be treated more easily. However, foreign substances such as seawater and dust tend to penetrate into the bearing through the outer circumference of the outer ring or the inner ring of the bearing body, degrading the corrosion resistance.

SUMMARY

The present invention is intended to overcome the above problem. An object of the present invention is to provide a fishing reel including a magnetic fluid sealed bearing wherein foreign substances are shut out from the magnetic fluid seal to prevent degradation of the magnetic fluid (degradation of the magnetic sealing function).

To overcome the above problem, the present invention provides a fishing reel comprising: a reel body; a handle connected to a wind driving mechanism included in the reel body; a spool supported on the reel body and configured to wind a fishing line in accordance with rotational operation of the handle; a bearing comprising a bearing body and a magnetic fluid seal retained integrally in the bearing body; a drive shaft rotatably supported by the bearing and configured to rotationally driven by operation of the handle; and a protection wall disposed on or near a side of the bearing body and configured to shut out foreign substances from the bearing body, wherein the bearing body has an inner ring, an outer ring, and rolling members, and wherein the magnetic fluid seal is configured to form a magnetic circuit with at least one of the inner ring and the outer ring and to internally seal the bearing body with a magnetic fluid retained between a polar plate and at least one of the inner ring and the outer ring.

In the above configuration, the protection wall may be disposed on or near the side of the bearing internally sealed with the magnetic fluid. Therefore, in reel operation or maintenance (oiling), grease, oil, or foreign substances such as seawater, sand, and dust may be shut out from the magnetic fluid sealed bearings so as to maintain the performance of the magnetic fluid (the function of the magnetic sealing). Therefore, the rotational performance of the drive shaft can be maintained.

In the above configuration, the magnetic fluid seal may be integrally built in the bearing body. Therefore, there is no need of having space for sealing in addition to the space for installing the bearing. Accordingly, only small space is necessary to install the magnetic seal and the bearing. Such a configuration in a fishing reel generally including multiple bearings and requiring sealing may eliminate the need of installing magnetic sealing mechanisms separately from the bearings and favorably enable downsizing of the entire reel. Further, there is no need of installing magnetic sealing mechanisms separately from the bearings, resulting in good built-in work efficiency and increased productivity (that is, reduced built-in work time and production costs). In particular, such a configuration may eliminate the need of sealing the bearing with an O-ring on the side of the magnetic fluid seal not magnetically sealed, and may prevent the problem of the magnetic sealing section tending to move such that the magnetic fluid seal does not integrate well with the bearing body.

Further, in the above configuration, the magnetic fluid seal may form magnetic circuits with the inner ring or the outer ring of the bearing body, not with members other than the bearing body. Therefore, freedom in selecting the materials of the other members may not be restricted (e.g., there is no need of forming the drive shafts of a magnetic material); and materials can be freely selected for satisfying the qualities required for the other members (the best materials can be selected for the other members).

The present invention provides a fishing reel including a magnetic fluid sealed bearing wherein foreign substances are shut out from the magnetic fluid seal to prevent degradation of the magnetic fluid (degradation of the magnetic sealing function).

DESCRIPTION OF EXAMPLE EMBODIMENTS

With reference to the attached drawings, detailed description will be hereinafter made on the fishing reel according to the present invention wherein a magnetic fluid seal is disposed integrally with a bearing.

Figure 1:
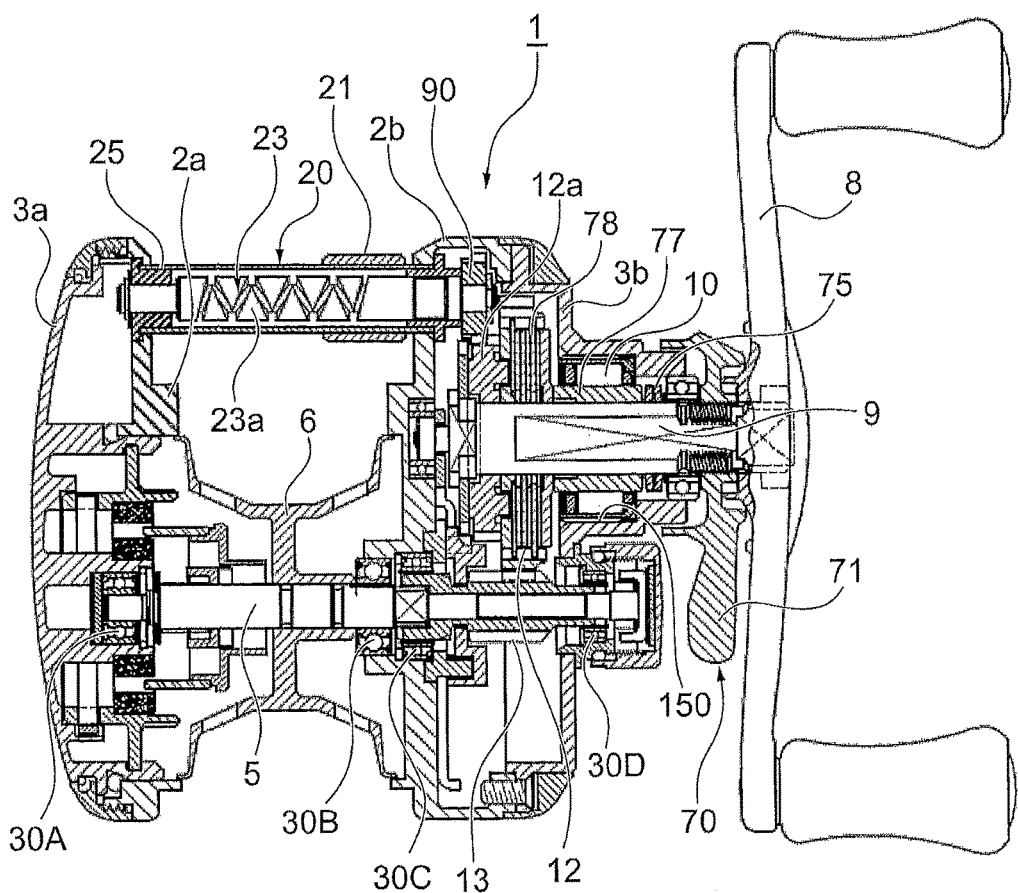
FIG. 1 is a sectional view of a fishing reel (double bearing reel) including a magnetic fluid sealed bearing according to a first embodiment of the present invention.
Figure 2:
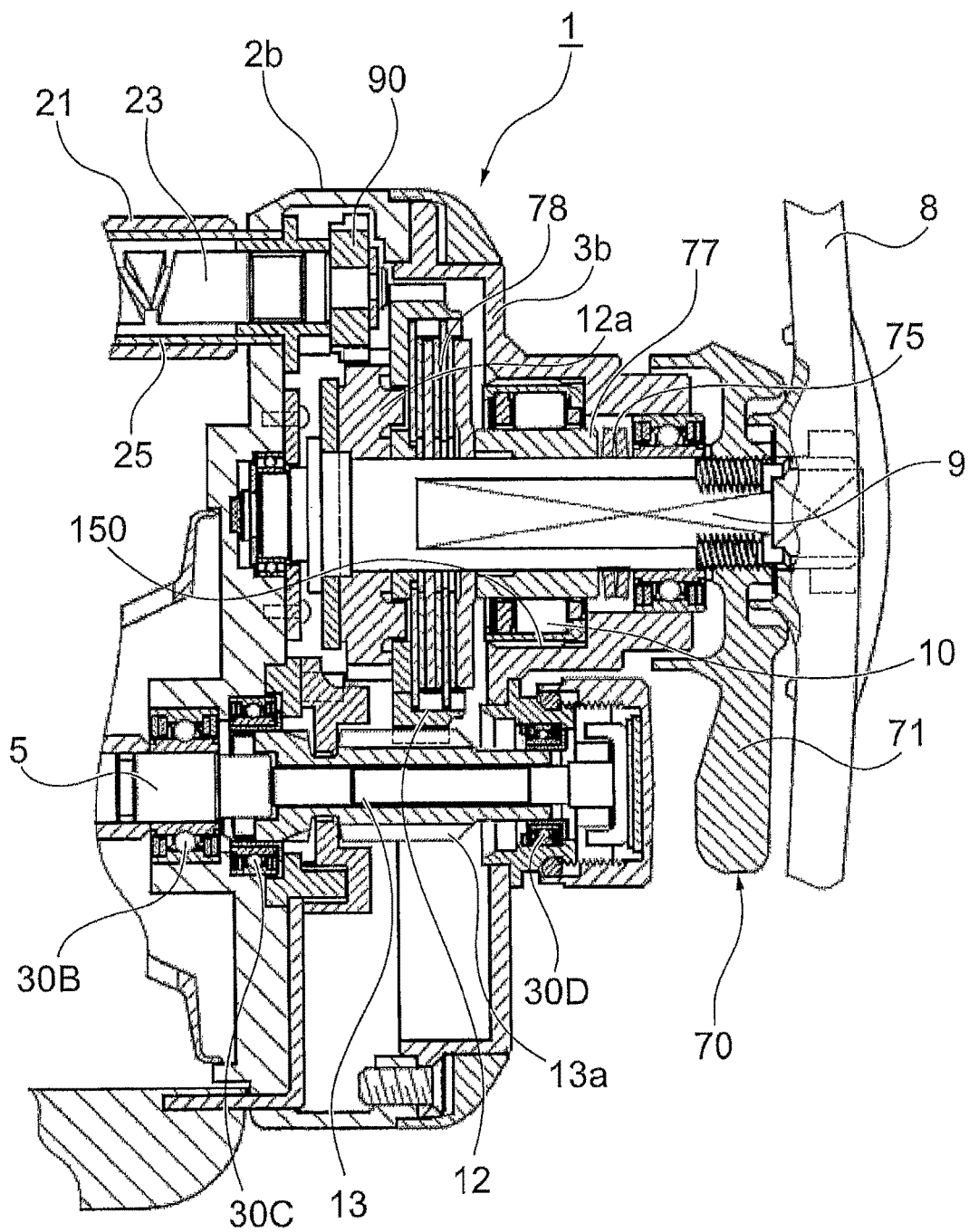
FIG. 2 is an enlarged sectional view including a wind driving section of the fishing reel shown in FIG. 1.

FIGS. 1 to 4 show a fishing reel including a magnetic fluid sealed bearing according to a first embodiment of the present invention wherein a magnetic fluid seal is disposed integrally with a bearing body. FIGS. 1 and 2 are sectional views of a double bearing reel as a fishing reel according to the embodiment. As shown, a reel body 1 of the double-bearing reel may include a left frame 2a and a left side plate 3a mounted on the left frame 2a with a predetermined space therebetween, and a right frame 2b and a right side plate 3b mounted on the right frame 2b in the same manner as the left side plate 3a. Between the left frame 2a and the right frame 2b (the left side plate 3a and the right side plate 3b) may be rotatably supported a spool shaft 5 via the bearings integrally provided with a magnetic fluid seal, that is, the magnetic fluid sealed bearings 30A, 30B (see FIG. 2). A spool 6 for winding a fishing line may be mounted on the spool shaft 5.

On the right side plate 3b side, a handle shaft 9 on which a handle 8 is mounted may be rotatably supported. The handle shaft 9 may be connected with a wind driving mechanism. When the handle 8 is rotationally operated, the spool 6 may be rotationally driven via the wind driving mechanism. The handle shaft 9 may be allowed to rotate only in the direction of winding the fishing line by a one-way clutch 10 disposed between the handle shaft 9 and the right side plate 3b.

The wind driving mechanism may include a drive gear 12 rotatably supported on the handle shaft 9 via a drag mechanism and a pinion 13 as a drive shaft meshing with the drive gear 12. The pinion 13 may be rotatably supported via magnetic fluid sealed bearings 30C, 30D and configured to be moved in an axial direction via a publicly known clutch mechanism to be engaged with and disengaged from the spool shaft 5. In the clutch-on state, the rotational drive force from the handle 8 may be transmitted to the spool 6 via the drive gear 12 and the pinion 13; and in the clutch-off state, the drive force transmission state may be canceled and the spool 6 may rotate freely. The clutch movement described above may be performed by operating an operation lever (not shown) projected from the reel body 1.

Between the left side plate 3a and the right side plate 3b and in front of the spool 6 may be provided a level wind mechanism 20. The level wind mechanism 20 may include a fishing line guide 21 configured to be reciprocated to the left and right in front of the spool 6 and having a insertion hole for admitting a fishing line, and a worm shaft 23 supported between the left and right side plates 3a, 3b and having an endless cam groove 23a formed in the circumference thereof.

The worm shaft 23 may be rotatably supported between the left and right frames via bearings and rotatably housed in a cylindrical member 25 having a through hole formed therein in an axial direction. An engagement pin retained by the fishing line guide 21 may be engaged with the endless cam groove 23a via the through hole to reciprocate the fishing line guide 21 to the left and right. The fishing line guide 21 may be supported by a guide pillar (not shown) supported between the left and right frames, such that the fishing line guide 21 may be prevented from rotating around the worm shaft 23 during the reciprocation.

On the right end of the worm shaft 23 may be fitted a gear 90 meshing with a gear 12a, the gear 12a being installed consecutively to the drive gear 12 in an axial direction so as to be rotatable integrally with the drive gear 12. The gear 90 may receive the rotational drive force produced by the winding operation of the handle 8 and transmitted via the handle shaft 9, the drive gear 12, and the gear 12a and may output the rotational drive force to the worm shaft 23.

In the embodiment, the right side plate 3b of the reel body 1 may have a housing recess 150 concavely formed therein. The housing recess 150 may partially house and support via a bearing the handle shaft 9 as a drive member for rotating with operation of the handle 8. The housing recess 150 may house and retain therein the one-way clutch 10 of a backstop in a positioned state (the backstop may be disposed in the housing recess 150).

In this arrangement, an operation body 71 constituting a publicly known drag mechanism 70 may be screwed in the right end of the handle shaft 9. When the operation body 71 is rotationally operated, a first pressing body, which may be a collar member fitted on the handle shaft 9 so as to be movable in an axial direction and rotatable integrally with the handle shaft 9, may move in the axial direction, press via a disc spring 75 a second pressing body 77 also serving as an inner ring of the one-way clutch 10, and press a friction member 78 at a desired pressing force, thereby to produce a braking force between the handle shaft 9 and the gear 12a.

Figure 3:
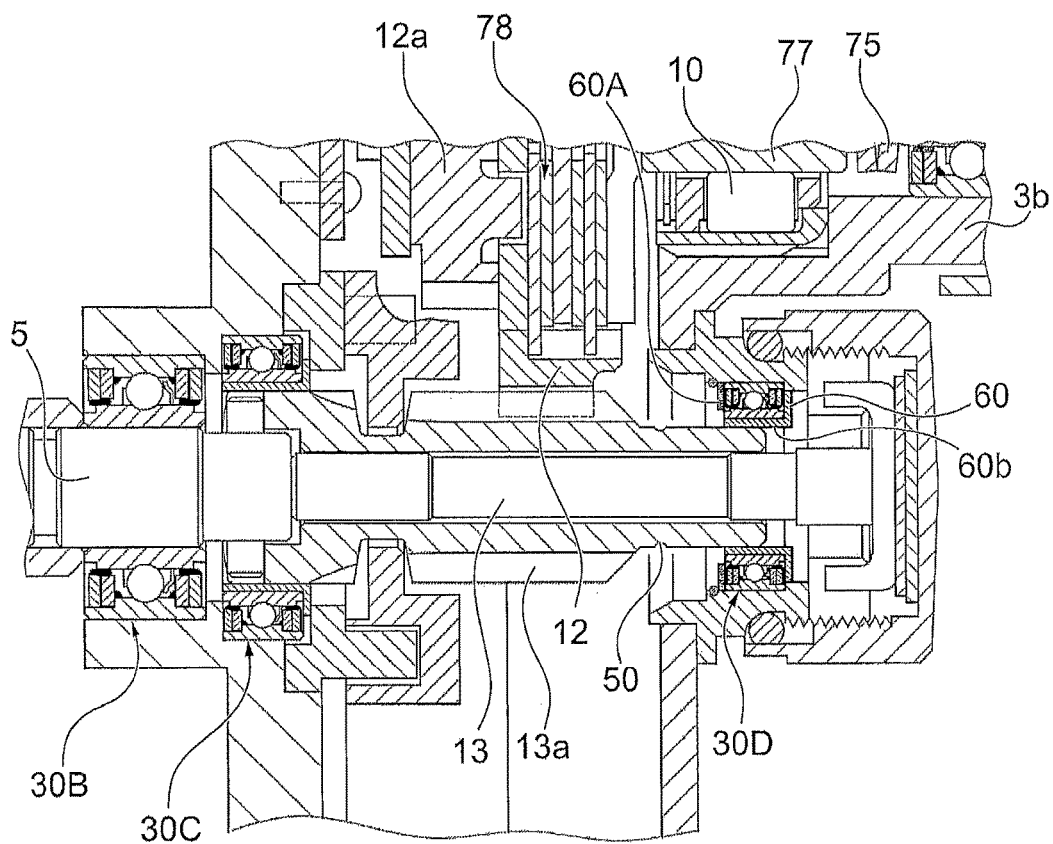
FIG. 3 is an enlarged sectional view including a main part shown in FIG. 2.
Figure 4:
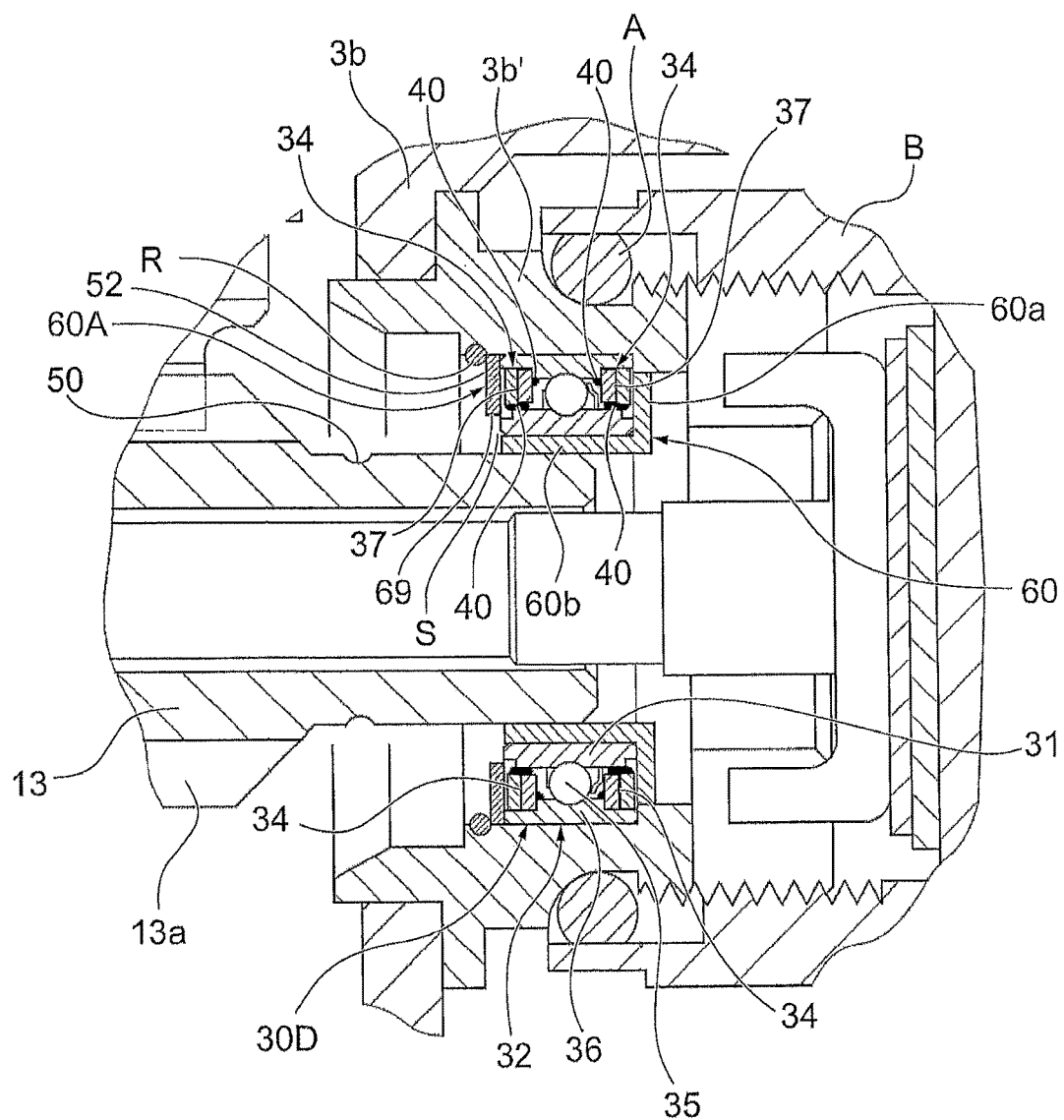
FIG. 4 is an enlarged sectional view including the magnetic fluid sealed bearing configured as shown in FIG. 2.

Next, reference will be made on FIGS. 3 and 4 to describe the magnetic fluid sealed bearings 30C, 30D according to the embodiment which may rotatably support the pinion 13. Since the magnetic fluid sealed bearings 30C, 30D have the same structure, only the magnetic fluid sealed bearing 30D will be described which may rotatably support the right end of the pinion 13.

As shown particularly in FIG. 4, the magnetic fluid sealed bearing 30D rotatably supporting the right end of the pinion 13 may include a bearing body 32 and a magnetic fluid seal 34 disposed in the bearing body 32 (between an inner ring 31 and an outer ring 36 described later) and internally sealing the bearing body 32. The bearing body 32 and the magnetic fluid seal 34 may be formed into an integral unit. The bearing body 32 may include an inner ring 31 made of a magnetic material which may be fitted on the outer circumferential surface of the pinion 13 and support the pinion 13, an outer ring 36 made of a magnetic material, and a rolling members 35 disposed between the inner ring 31 and the outer ring 36 so as to be rollable. The rolling members 35 may be disposed between left and right plates enclosing the rolling members tightly and may be retained by the inner ring 31, the outer ring 36, and a retainer (not shown).

Meanwhile, the magnetic fluid seal 34 may be retained integrally with the bearing body 32. In the embodiment, the magnetic fluid seal 34 may form magnetic circuits with the inner ring 31 and the outer ring 36 to internally seal the bearing body 32. More specifically, the magnetic fluid seal 34 may include a magnet forming the magnetic circuits with the inner ring 31 and the outer ring 36 (the magnet may be magnetized in the axial direction in the embodiment), a single or a pair of polar plates 37 retaining the magnet, and a magnetic fluid 40 retained between the inner and outer rings 31, 36 and the polar plates 37. As to the magnetic fluid seal 34, a magnetic circuit may be formed only between the polar plate 37 and the outer ring 36 or only between the polar plate 37 and the inner ring 31 such that the magnetic fluid may be retained only between the polar plate 37 and the outer ring 36 or only between the polar plate 37 and the inner ring 31. Alternatively, the magnetic fluid may be retained between the polar plate 37 and the outer ring 36 and between the polar plate 37 and the inner ring 31. Any other suitable configuration can also be applied. The above configuration may also apply to the magnetic fluid sealed bearings 30A, 30B rotatably supporting the spool shaft 5.

As to thus configured magnetic fluid sealed bearing 30D, protection walls 60, 60A may be disposed opposite to each other on or near both sides of the bearing body 32, respectively, for shutting out foreign substances from the bearing body 32 (alternatively, a protection wall may be disposed on only one side of the bearing).

More specifically, the first protection wall 60 may be positioned on the right of the magnetic fluid sealed bearing 30D, or opposite to the teeth 13a of the pinion 13 across the bearing 30D (for the magnetic fluid sealed bearing 30C, the first protection wall 60 may be positioned on the side facing the teeth 13a of the pinion 13). The first protection wall 60 may include an annular protection wall section 60a disposed on or near the right side surface of the bearing 30D and a tubular collar section 60b placed between the inner ring 31 and the pinion 13 (drive shaft). The protection wall section 60a and the collar section 60b may be integrally formed of, for example, a resin material.

On the other hand, the second protection wall 60A may be positioned on the left of the magnetic fluid sealed bearing 30D, or on the side facing the teeth 13a of the pinion 13. The second protection wall 60A may include an annular body having a tabular shape disposed on or near the left side surface of the bearing 30D. A seal member 52 included in the second protection wall 60A may be retained so as not to come off by the locking member R locked by, e.g., the bearing support section 3b' of the reel body 3b. A clearance S may be provided between a facing end 69 of the second protection wall 60A facing the inner ring 31 and the pinion 13, and the inner ring 31 and the pinion 13 (the outer circumferential surface), such that the inner circumferential surface of the seal member 52 included in the protection wall 60A may not interfere with the rotational movement of the inner ring 31 and the pinion 13.

The protection walls 60, 60A may be provided integrally with or removably on, e.g., the bearing support section 3b' of the reel body 3b. The protection walls 60, 60A may also retain the bearing 30D so as not to come off. Further, the protection walls 60, 60A may be formed of a metallic material such as aluminum or other materials including resin materials (e.g., polyacetal).

In the embodiment, the outer circumferential surface of the pinion 13 may be provided with an annular recess 50 for receiving oil and foreign substances moving toward the bearing body 32 of the magnetic fluid sealed bearing 30D. In the embodiment, the recess 50 may be provided in the outer circumferential surface of the pinion 13 between the teeth 13a of the pinion 13 and the bearing 30D.

In the embodiment as described above, the protection walls 60, 60A may be disposed opposite to each other on or near the sides of the magnetic fluid sealed bearings 30C, 30D internally sealed with the magnetic fluid. Therefore, in reel operation or maintenance (oiling), grease, oil, or foreign substances such as seawater, sand, and dust may be shut out from the magnetic fluid sealed bearings 30C, 30D so as to maintain the performance of the magnetic fluid (the function of the magnetic sealing). In particular, since such a structure is applied to the bearings 30C, 30D of the pinion 13 movable in the axial direction by switching of the clutch, an oil separated from the grease applied to the teeth 13a of the pinion 13 meshing with the drive gear 12 may be prevented from penetrating into the magnetic fluid sealed bearing 30C, 30D as the pinion 13 moves in the axial direction and degrading the magnetic fluid. Thus, the rotational performance and the clutching performance of the pinion 13 as a drive shaft can be maintained.

In the embodiment, an annular recess 50 may be provided in the outer circumferential surface of the pinion 13 for receiving foreign substances moving toward the bearing body 32 of the magnetic fluid sealed bearing 30D. Therefore, an oil separated from the grease applied to the teeth 13a of the pinion 13 can be stopped before reaching the bearing 30D. This may securely shut out the foreign substances from the bearing along with the protection walls 60, 60A. In the embodiment, the protection wall 60 may include a tubular collar section 60b placed between the inner ring 31 and the pinion 13, which may favorably prevent foreign substances from flowing round the bearings 30C, 30D.

In the embodiment, the magnetic fluid seal 34 may be integrally built in the bearing body 32. Therefore, there is no need of having space for sealing in addition to the space for installing the bearing body 32. Accordingly, only small space is necessary to install the magnetic seal and the bearing. Such a configuration in a fishing reel generally including multiple bearings and requiring sealing may eliminate the need of installing magnetic sealing mechanisms separately from the bearings and favorably enable downsizing of the entire reel. Further, there is no need of installing magnetic sealing mechanisms separately from the bearings, resulting in good built-in work efficiency and increased productivity (that is, reduced built-in work time and production costs). In particular, such a configuration may eliminate the need of sealing the bearing with an O-ring on the side of the magnetic fluid seal not magnetically sealed, and may prevent the problem of the magnetic sealing section tending to move such that the magnetic fluid seal does not integrate well with the bearing body.

Further, in the embodiment, the magnetic fluid seal 34 may form magnetic circuits with the inner ring 31 or the outer ring 36 of the bearing body 32, not with members other than the bearing body 32. Therefore, freedom in selecting the materials of the other members may not be restricted (e.g., there is no need of forming the drive shafts of a magnetic material); and materials can be freely selected for satisfying the qualities required for the other members (the best materials can be selected for the other members). In the embodiment, an O-ring A may be mounted on the outer circumference of the open end of the bearing support section 3b', and an adjuster B for pressing an end of the spool shaft 5 to provide the spool 6 with a rotational resistance may be screwed on the bearing support section 3b'. The O-ring A may provide water tightness between these components (see FIG. 4). In combination with the above described protection walls 60, 60A, this arrangement may more securely and efficiently prevent penetration of seawater, sand, and dust.

Figure 5:
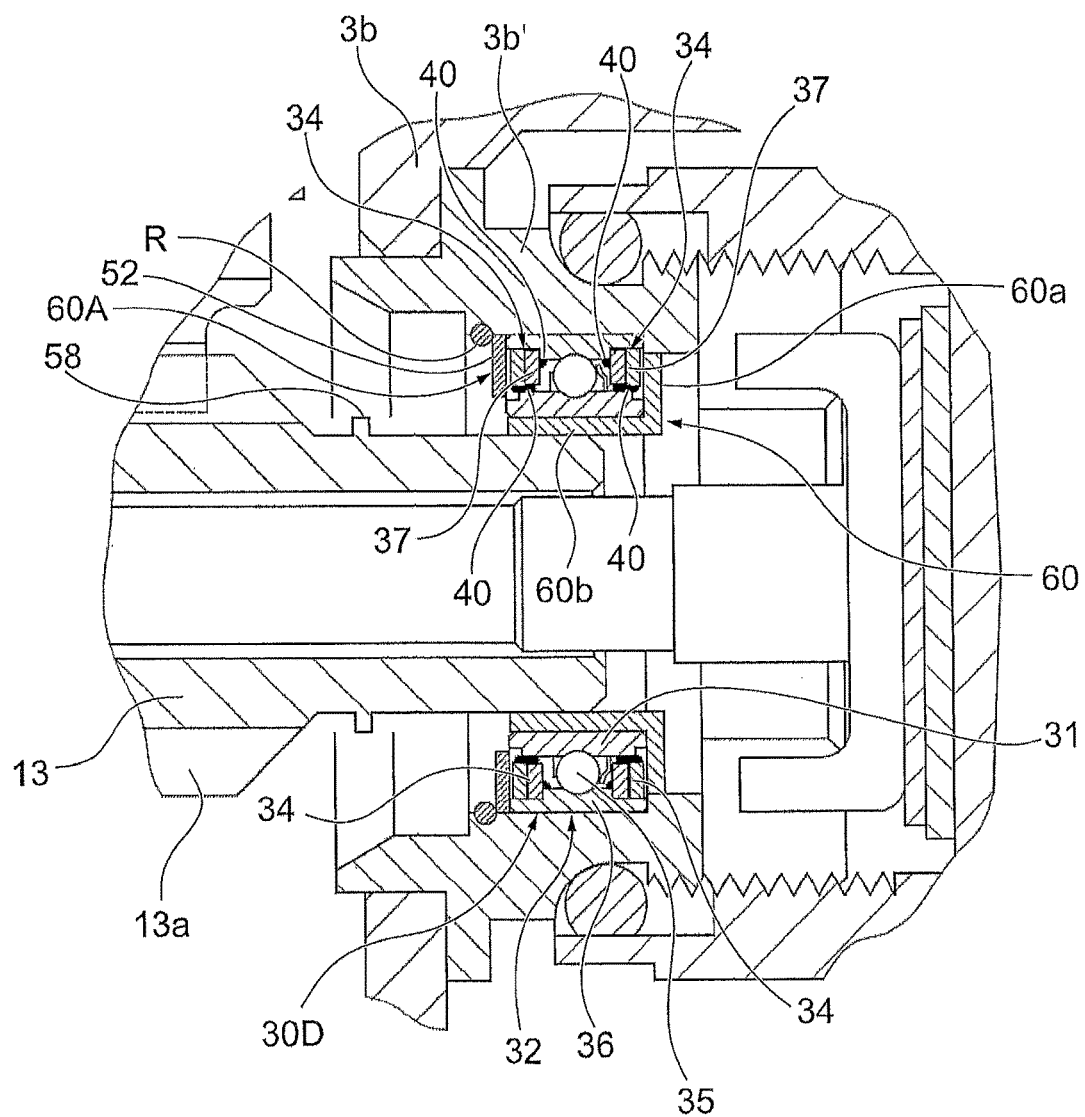
FIG. 5 is an enlarged sectional view according to a variation of FIG. 4.

FIG. 5 shows an exemplary variation of the above described first embodiment. In the exemplary variation, an annular projection 58 may be provided in place of the annular recess 50 on the outer circumference of the pinion 13 in the first embodiment. In other respects, the exemplary variation is configured in the same way as the first embodiment.

Such a projection 58 may also receive the foreign substances moving toward the bearing body 32 of the magnetic fluid sealed bearing 30D. In particular, the projection 58 may block the oil separated from the grease applied to the teeth 13a of the pinion 13 before it reaches the bearing 30D.

Figure 6:
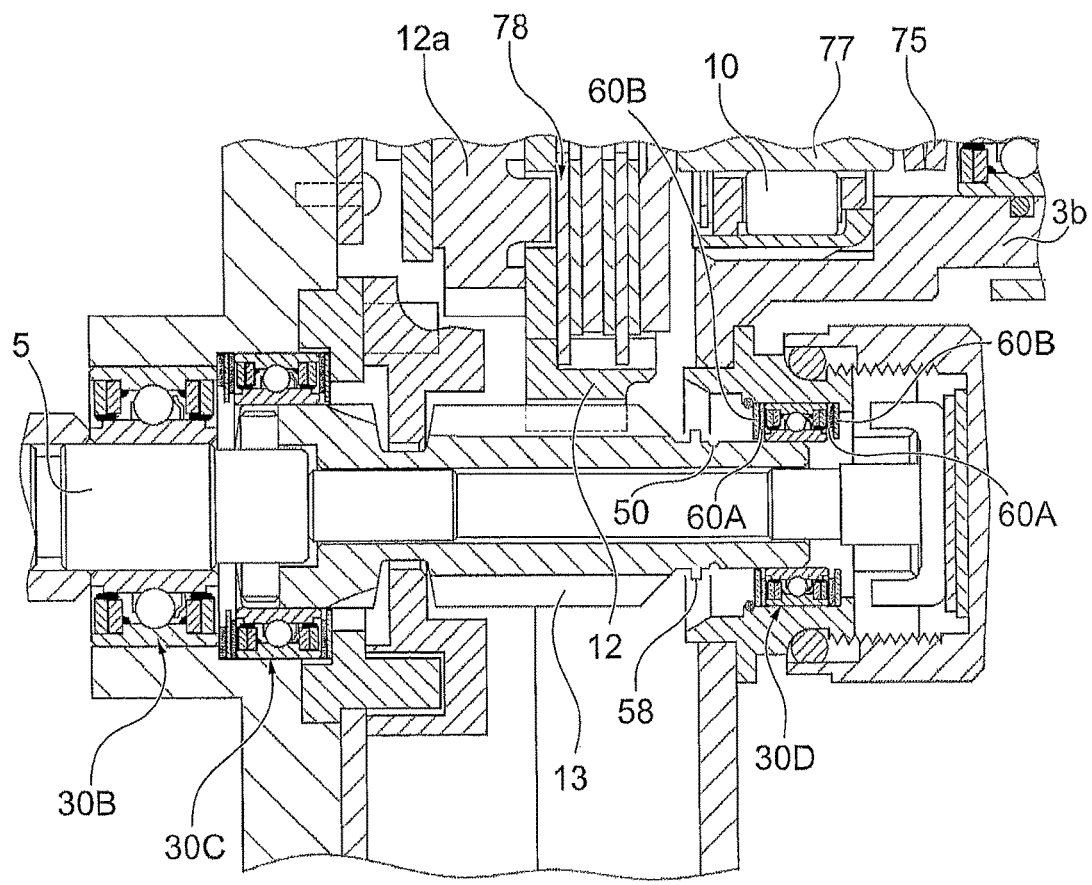
FIG. 6 is an enlarged sectional view of a main part a fishing reel (double bearing reel) including a magnetic fluid sealed bearing according to a second embodiment of the present invention.
Figure 7:
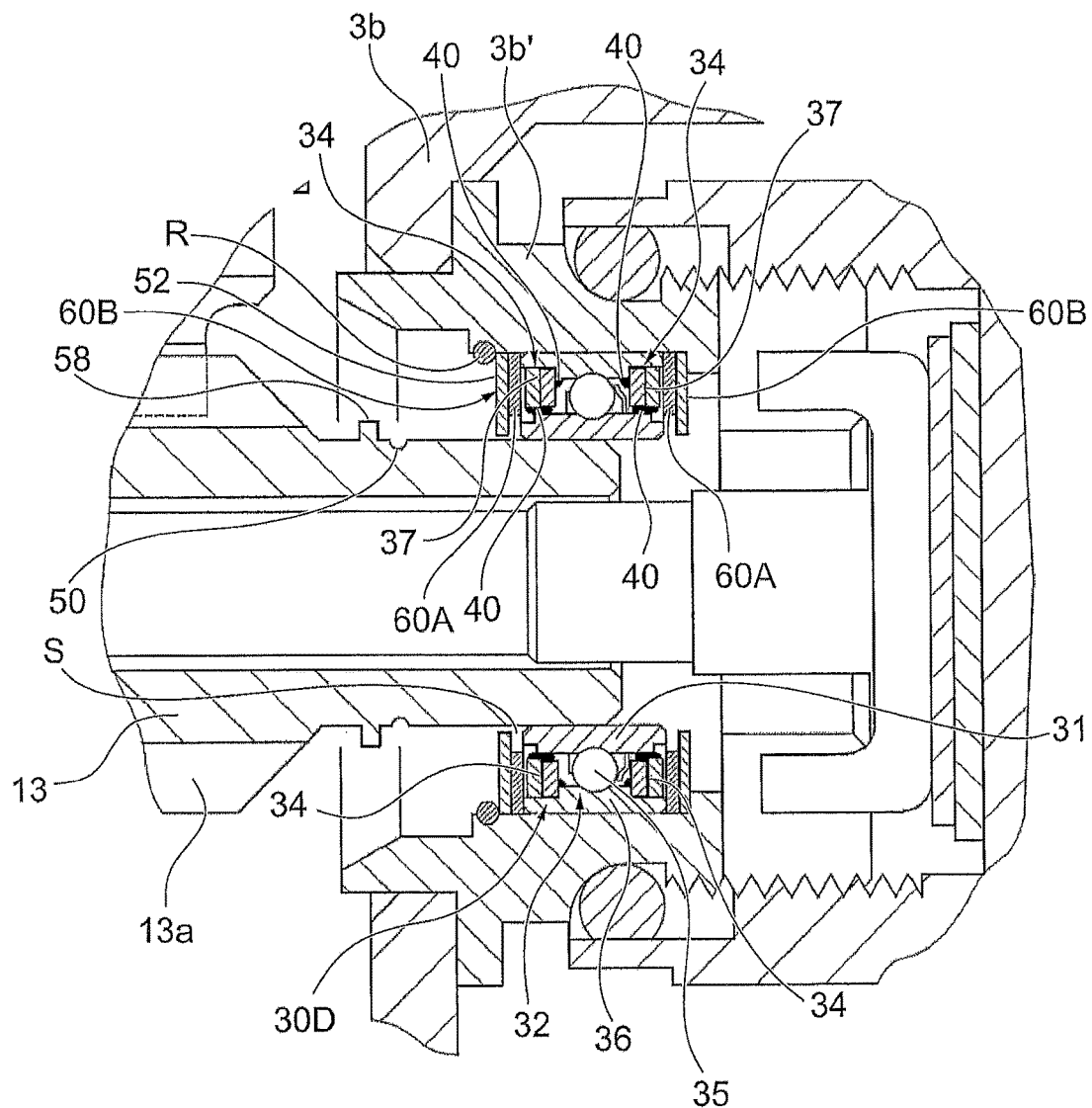
FIG. 7 is an enlarged sectional view including the magnetic fluid sealed bearing configured as shown in FIG. 6.

FIGS. 6 and 7 are enlarged sectional views of a main part of a fishing reel (double bearing reel) including a magnetic fluid sealed bearing according to a second embodiment of the present invention. In the second embodiment shown, the first protection wall 60 in the first embodiment may be replaced with a second protection wall 60A. That is, the second protection walls 60A may be provided on both sides of the magnetic fluid sealed bearing 30D. In addition, third protection walls 60B may be provided on the axial outer sides of the second protection walls 60A provided on both sides of the magnetic fluid sealed bearing 30D. The third protection walls 60B may extend longer than the second protection walls 60A in the radial direction to be closer to the outer circumferential surface of the pinion 13, leaving a clearance S between a facing end of the third protection wall 60B facing the inner ring 31 and the pinion 13, and the inner ring 31 and the pinion 13 (the outer circumferential surface), so as not to interfere with the rotational movement of the pinion 13, as with the second protection walls 60A. The third protection walls 60B on the outer sides may also retain the bearing 30D so as not to come off and may be formed of a washer made of brass or aluminum; and the second protection walls 60A on the inner sides may be formed of a resin washer or a felt. Both protection walls 60A, 60B should preferably be impregnated with the magnetic fluid for enhancing the sealing quality. In the embodiment, the outer circumferential surface of the pinion 13 may be provided with an annular recess 50 and an annular projection 58 adjacent to each other for receiving oil or foreign substances moving toward the bearing body 32 of the magnetic fluid sealed bearing 30D. The projection 58 may be closer to the teeth 13a of the pinion 13, and the recess 50 may be closer to the bearing 30D.

Such a tiered structure of protection walls 60A, 60B can also produce a sealing effect (foreign substance shutting effect) which is the same as or better than that in the first embodiment.

Figure 8:
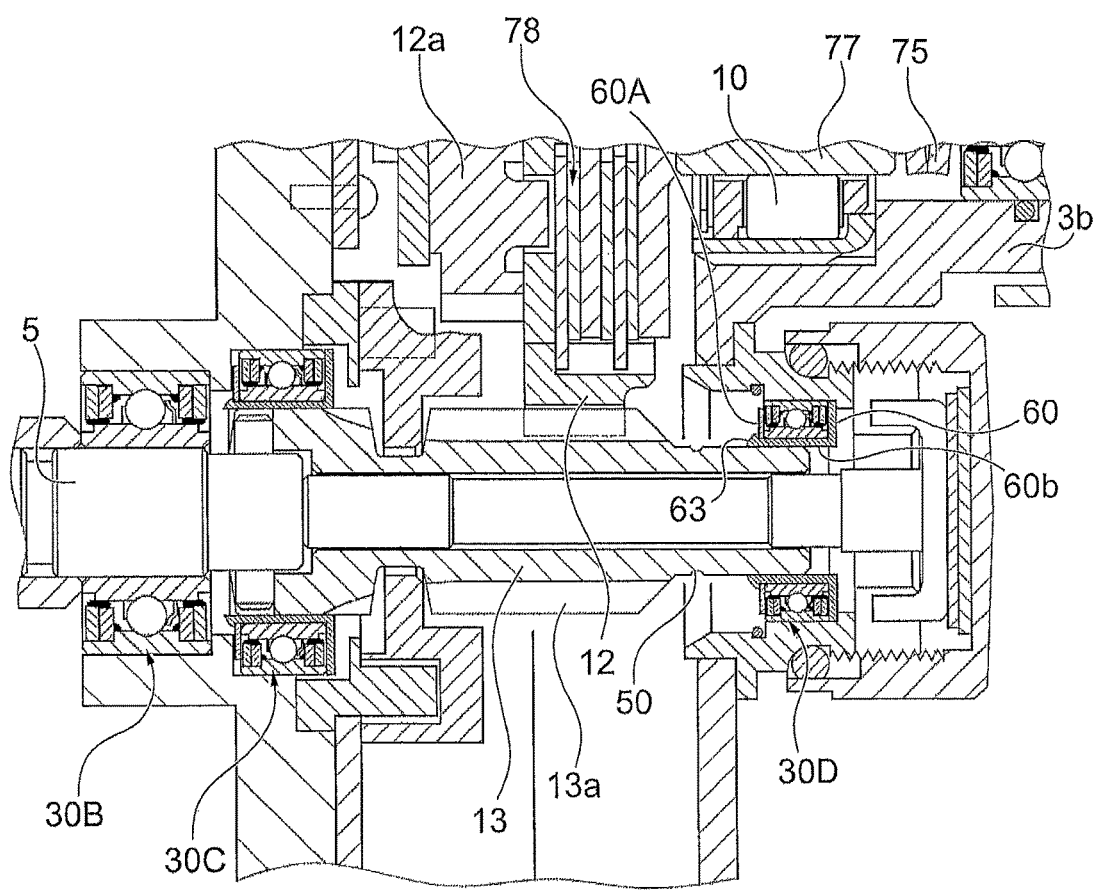
FIG. 8 is an enlarged sectional view of a main part of a fishing reel (double bearing reel) including a magnetic fluid sealed bearing according to a third embodiment of the present invention.
Figure 9:
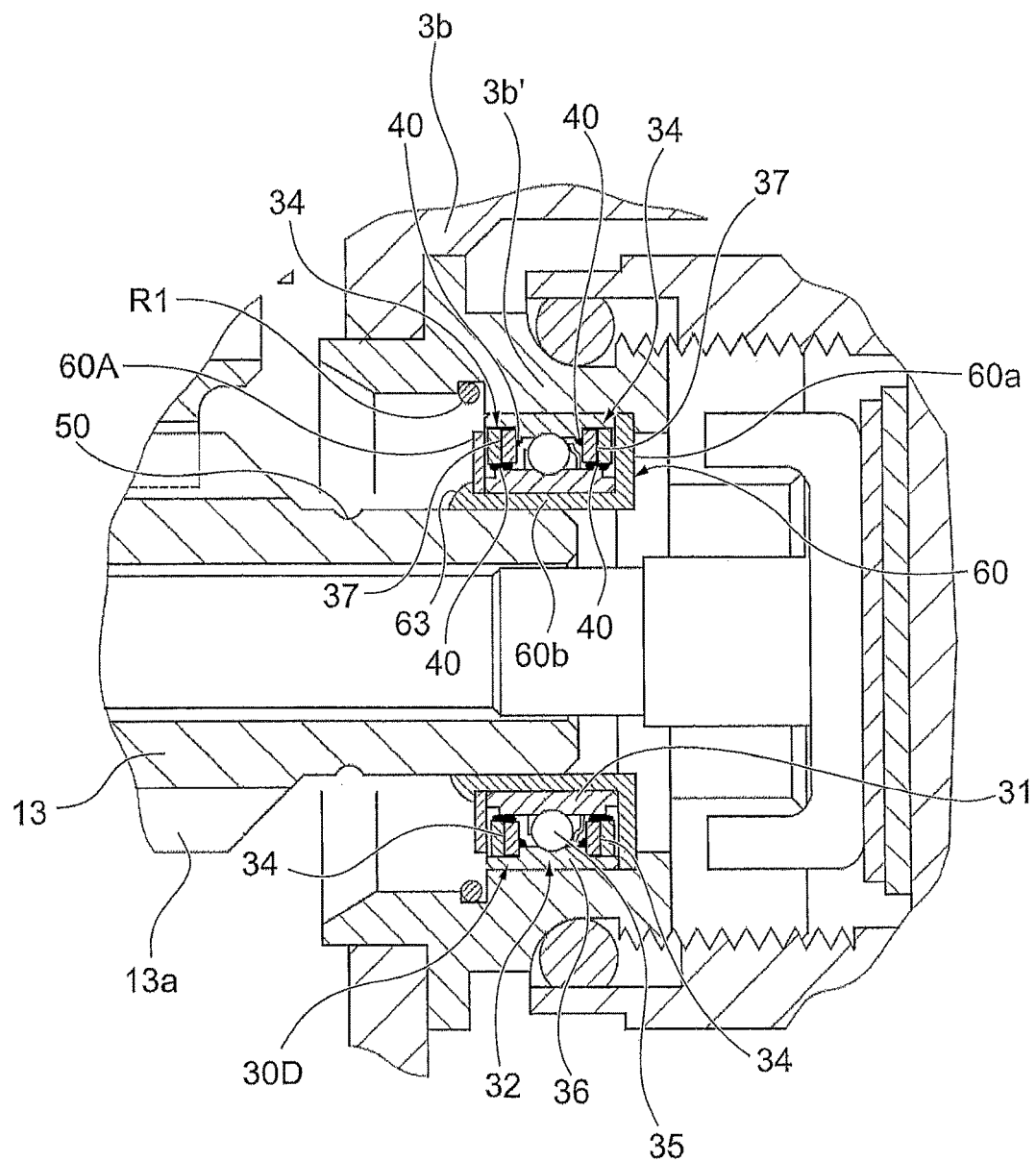
FIG. 9 is an enlarged sectional view including the magnetic fluid sealed bearing configured as shown in FIG. 8.

FIGS. 8 and 9 are enlarged sectional views of a main part of a fishing reel (double bearing reel) including a magnetic fluid sealed bearing according to a third embodiment of the present invention. As shown, the third embodiment is an exemplary variation of the first embodiment, wherein a locking section 63 may be provided on an end of the collar section 60b of the first protection wall 60 in the first embodiment (the end opposite to the end on which the protection wall section 60a may be formed); and on the locking section 63 may be elastically locked the second protection wall 60A so as to be removable. In the embodiment, the inner circumferential surface of the protection wall 60A may be locked by fitting into the outer circumference of the locking section 63 (the locking section 63 may be formed of a plurality of circumferential projections). In the embodiment, the collar section 60b may integrate the protection walls (the protection wall section 60a of the first protection wall 60 and the second protection wall 60A) positioned on both sides of the bearing 30D with each other, so as to integrate these protection walls with the bearing 30D. The locking member R1 locked on, e.g., the bearing support section 3b' of the reel body 3b may be a polygonal retaining ring that may retain the unitized bearing 30D so as not to come off from the bearing support section 3b'.

Thus, in the embodiment, the magnetic fluid sealed bearings 30C, 30D and the protection walls 60, 60A may form an integral unit, resulting in excellent built-in work efficiency and a secure sealing effect (foreign substance shutting effect) for the bearing body.

Embodiments of the present invention are not limited to the above descriptions and are susceptible to various modifications within the purport of the present invention. For example, the configuration of the magnetic fluid seal may be suitably modified in accordance with the portion to which it is applied. The positions of the polar plates, magnets, and magnetic fluids may be desirably decided without limitation as long as sealing can be achieved with the magnetic fluids. The present invention, which is applied to a double bearing reel in the above described embodiments, can also be applied to a spinning reel. Naturally, the above embodiments can be combined with each other. Additionally, the above embodiments were described as to the magnetic fluid sealed bearings 30C, 30D which rotatably supports the pinion 13. The configuration of the magnetic fluid sealed bearings 30C, 30D may also be applied to the bearings rotatably supporting other drive shafts such as the spool shaft 5, worm shaft 23, and the handle shaft 9.

What is claimed is:
1. A fishing reel comprising:
   a reel body;
   a handle connected to a wind driving mechanism included in the reel body;
   a spool supported on the reel body and configured to wind a fishing line in accordance with rotational operation of the handle;
   a bearing comprising a bearing body and a magnetic fluid seal retained integrally in the bearing body;
   a drive shaft rotatably supported by the bearing and configured to rotationally driven by operation of the handle; and
   a protection wall comprising wall portions disposed opposite to each other on or near both sides of the bearing body and configured to shut out foreign substances from the bearing body,
   wherein the bearing body has an inner ring, an outer ring, and rolling members, wherein the magnetic fluid seal is configured to form a magnetic circuit with at least one of the inner ring and the outer ring and to internally seal the bearing body with a magnetic fluid retained between a polar plate and at least one of the inner ring and the outer ring, and wherein the protection wall includes a collar section placed between the inner ring and the drive shaft.

2. The fishing reel of claim 1 wherein an outer circumferential surface of the drive shaft is provided with an annular recess or an annular projection for receiving foreign substances moving toward the bearing body.

3. The fishing reel of claim 1 wherein the protection wall is removably provided on the reel body and also retains the bearing so as not to come off.

4. The fishing reel of claim 1, wherein the collar section integrates the wall portions of the protection wall positioned on both sides of the bearing and thereby integrates the protection wall with the bearing.

5. The fishing reel of claim 4 wherein one of the wall portions of the protection wall positioned on one side of the bearing and the collar section are formed integrally with each other, and the other wall portion of the protection wall positioned on the other side of the bearing is elastically locked on the collar member so as to be removable.

6. The fishing reel of claim 1 wherein a clearance is provided between a facing end of the protection wall facing the inner ring and the drive shaft, and the inner ring and the drive shaft, such that the protection wall does not interfere with the rotational movement of the drive shaft.

7. The fishing reel of claim 1 wherein a plurality of protection walls are provided on one side of the bearing.

8. A fishing reel comprising:
a reel body;
a handle connected to a wind driving mechanism included in the reel body;
a spool supported on the reel body and configured to wind a fishing line in accordance with rotational operation of the handle;
a bearing comprising a bearing body and a magnetic fluid seal retained integrally in the bearing body;
a drive shaft rotatably supported by the bearing and configured to rotationally driven by operation of the handle; and
a protection wall disposed on or near a side of the bearing body and configured to shut out foreign substances from the bearing body,
wherein the bearing body has an inner ring, an outer ring, and rolling members,
wherein the magnetic fluid seal is configured to form a magnetic circuit with at least one of the inner ring and the outer ring and to internally seal the bearing body with a magnetic fluid retained between a polar plate and at least one of the inner ring and the outer ring, and
wherein the protection wall includes a collar section placed between the inner ring and the drive shaft.

9. The fishing reel of claim 8, wherein an outer circumferential surface of the drive shaft is provided with an annular recess or an annular projection for receiving foreign substances moving toward the bearing body.

10. The fishing reel of claim 8, wherein a clearance is provided between a facing end of the protection wall facing the inner ring and the drive shaft, and the inner ring and the drive shaft, such that the protection wall does not interfere with the rotational movement of the drive shaft.

11. A fishing reel comprising:
a reel body;
a handle connected to a wind driving mechanism included in the reel body;
a spool supported on the reel body and configured to wind a fishing line in accordance with rotational operation of the handle;
a bearing comprising a bearing body and a magnetic fluid seal retained integrally in the bearing body;
a drive shaft rotatably supported by the bearing and configured to rotationally driven by operation of the handle;
a protection wall disposed on both sides of the bearing body and configured to shut out foreign substances from the bearing body; and
a collar section placed between the inner ring and the drive shaft,
wherein the bearing body has an inner ring, an outer ring, and rolling members,
wherein the collar section integrates the protection wall with the bearing, and
wherein the magnetic fluid seal is configured to form a magnetic circuit with at least one of the inner ring and the outer ring and to internally seal the bearing body with a magnetic fluid retained between a polar plate and at least one of the inner ring and the outer ring.

12. The fishing reel of claim 11, wherein the protection wall comprises a first wall and a second wall and the collar section has a locking section, wherein the first wall is positioned on one side of the bearing and formed integrally with the collar section, wherein the second wall is positioned on the other side of the bearing, and wherein the locking section is elastically locked to the second wall.

13. The fishing reel of claim 11, wherein an outer circumferential surface of the drive shaft is provided with an annular recess or an annular projection for receiving foreign substances moving toward the bearing body.

14. The fishing reel of claim 11, wherein a clearance is provided between a facing end of the protection wall facing the inner ring and the drive shaft, and the inner ring and the drive shaft, such that the protection wall does not interfere with the rotational movement of the drive shaft.

* * * * *